US008476182B2

(12) United States Patent
Diaz Velasquez et al.

(10) Patent No.: US 8,476,182 B2
(45) Date of Patent: Jul. 2, 2013

(54) PROCESS FOR MAKING A CATALYST SUITABLE FOR DIRECT COAL LIQUEFACTION AND THE CATALYST THEREOF

(76) Inventors: Jose De Jesus Diaz Velasquez, Bogota D.C. (CO); Yazmin Yaneth Agamez Pertuz, Bogota D.C. (CO); Luis Ignacio Rodriguez Varela, Bogota D.C. (CO); Orlando Hernandez Fandino, Bogota D.C. (CO); Oscar Andres Villaba Varon, Bogota D.C. (CO); Jose Alexandre Jimenez Sanchez, Bogota D.C. (CO)

( * ) Notice: Subject to any disclaimer, the term of this patent is extended or adjusted under 35 U.S.C. 154(b) by 0 days.

(21) Appl. No.: 13/038,100

(22) Filed: Mar. 1, 2011

(65) Prior Publication Data

US 2011/0152069 A1 Jun. 23, 2011

Related U.S. Application Data

(63) Continuation of application No. PCT/IB2009/053816, filed on Sep. 2, 2009.

(30) Foreign Application Priority Data

Sep. 2, 2008 (CO) .................................. 08 091695

(51) Int. Cl.
| B01J 31/00 | (2006.01) |
| B01J 21/18 | (2006.01) |
| B01J 23/00 | (2006.01) |
| B01J 27/02 | (2006.01) |
| B01J 27/053 | (2006.01) |
| B01J 27/055 | (2006.01) |
| B01J 27/047 | (2006.01) |
| B01J 27/051 | (2006.01) |
| B01J 27/049 | (2006.01) |
| B01J 27/043 | (2006.01) |

(52) U.S. Cl.
USPC ........... 502/180; 502/138; 502/182; 502/216; 502/217; 502/218; 502/219; 502/220; 502/221; 502/222

(58) Field of Classification Search
USPC .......................... 502/138, 180, 182, 216–222
See application file for complete search history.

(56) References Cited

U.S. PATENT DOCUMENTS

| 3,147,154 A * | 9/1964 | Cole et al. ................... 148/264 |
| 3,912,783 A * | 10/1975 | Wedemeyer et al. ......... 568/730 |
| 4,320,030 A * | 3/1982 | Happel et al. ................. 502/202 |
| 5,374,598 A * | 12/1994 | Stonehart et al. ............. 502/185 |
| 2011/0120914 A1* | 5/2011 | Kuperman et al. ........... 208/403 |

OTHER PUBLICATIONS

"The effect of adsorption of thiourea on the particle size of supported platinum nanocatalysts synthesized by chemical reduction," E. G. Ciapina et al. Journal of Power Sources 175 (2008), pp. 18-25.*

(Continued)

*Primary Examiner* — Patricia L Hailey
(74) *Attorney, Agent, or Firm* — Patent Law Agency, LLC; Peter Ganjian

(57) ABSTRACT

A method to obtain a catalyst of transition metals supported on a carbonaceous material, via impregnation, with a solution of metal-thiourea complex, obtained from precursor salts. The formation of the sulfur on the surface of the support occurs through the thermal decomposition of the complex. The obtained catalysts are applicable toward the direct liquefaction of coal.

14 Claims, 3 Drawing Sheets

OTHER PUBLICATIONS

"Co, Fe, and Ni Catalysts Supported on Coke for Direct Coal Liquefaction," Jose A. Jimenez et al. Revista Colombiana De Quimica, vol. 37, Issue 2 (1979), pp. 233-242 (English translation included).*

"Development of Standard Direct Coal Liquefaction Activity Tests for Fine-Particle Size, Iron-Based Catalsyts," Frances V. Stohl et al. Energy & Fuels 1994, 8, pp. 117-123.*

PCT/IB2009/053816, Sep 2, 2009; WO2010/026530, Mar. 11, 2010.
Stohl F., Diegert K.V. (1994) Development of standard direct coal liquefaction activity tests for fine particle size, iron based catalysts. Energy & Fuels 8, 117-123.

Priyanto U., Sakanishi K., Okuma O., Sumbogo Murti S., Watanable I., Korai Y., Mochida I. (2001) Optimization of two-stage liquefaction of Tanito Harem coal with FeNi catalyst supported on carbon black Energy & Fuels 15, 856-862.

Rincóon J.M., Angulo R. (1986) Petroleum heavy oil mixtures as a source of hydrogen in the liquefaction of Cerrejon coal. Fuel 65 (7) 899-902).

Gözmen B. and coworkers (2002. Direct liquefaction of high-sulfur coals. Energy & Fuels 16, 1040-1047).

* cited by examiner

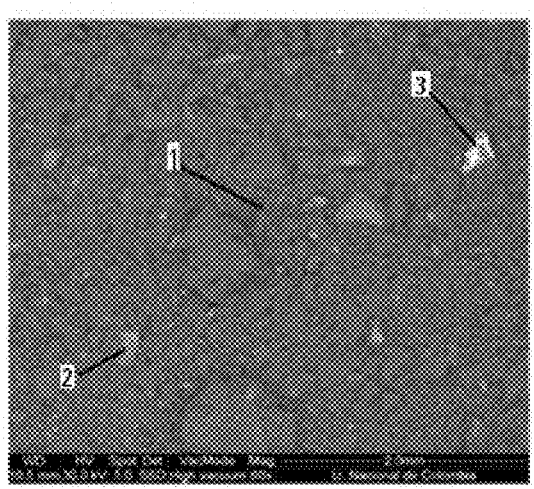
Figure 2a
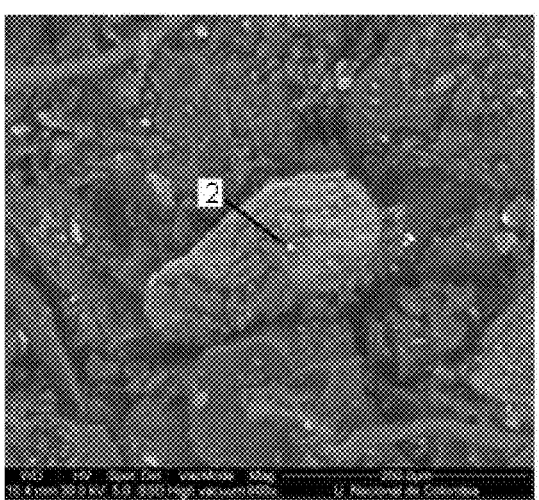
Figure 2b
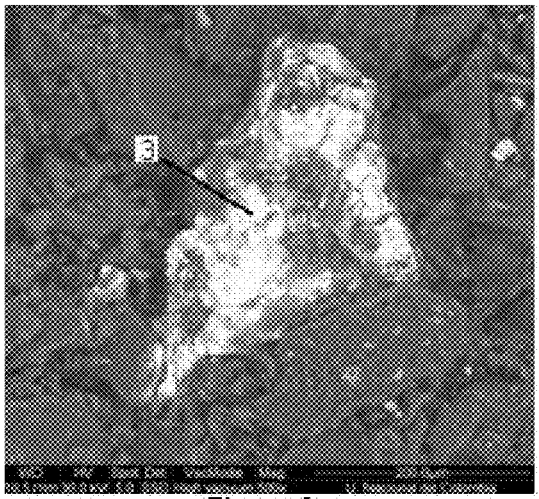
Figure 2c
Figure 2

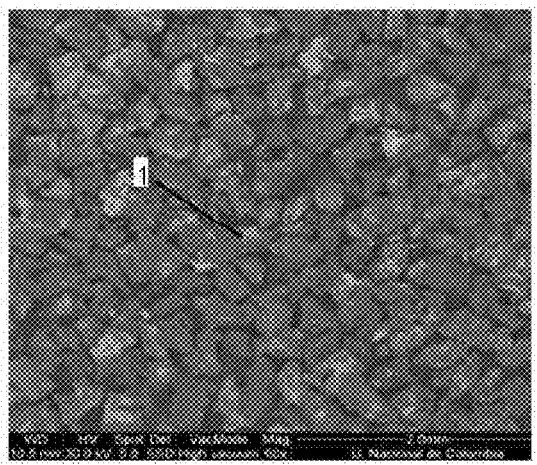
Figure 3a
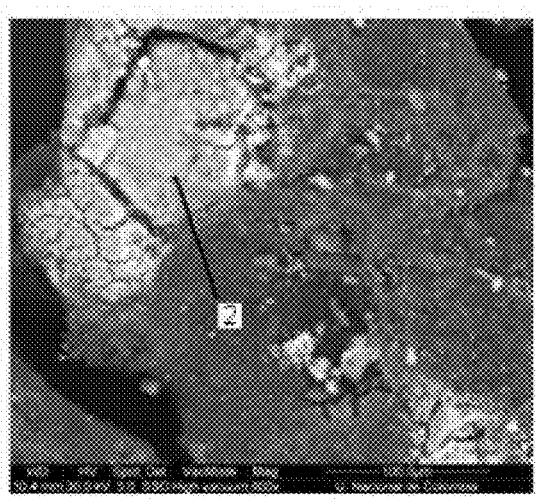
Figure 3b
Figure 3

PROCESS FOR MAKING A CATALYST SUITABLE FOR DIRECT COAL LIQUEFACTION AND THE CATALYST THEREOF

CROSS-REFERENCE TO RELATED APPLICATIONS

This application is a CONTINUATION application claiming the benefit of priority of the co-pending International Patent Application No. PCT/IB2009/053816 with an international filing date of 2 Sep. 2009 that designated the United States, which claims the benefit of priority of Republic of Colombia Patent Application No. 08 091695, filed 2 Sep. 2008, the entire disclosures of all Applications are expressly incorporated by reference in their entirety herein.

BACKGROUND OF THE INVENTION

1. Field of the Invention

The present invention relates to a process for making a catalyst suitable for direct coal liquefaction and the catalysts thereof.

2. Description of Related Art

It is known that direct coal liquefaction (DCL) was developed as a commercial process in Germany, based on the research of Friedrich-Bergius who established that the coal liquefaction consists into two competitive reactions: a) hydrogen addition at high temperature and pressure to turn coal structure into a heavy hydrocarbon, and b) rupture of the heavy hydrocarbons. In this way, the coal liquefaction is a process that converts the carbonaceous material, such as coal, into liquid fuels or "synthetic fuel". Despite of the different variables of the process, all of them agree that the coal is dissolved in a solvent at high pressure and temperature, and then, a coal-derived liquid fuel is obtained through the coal hydrogenation in the presence of a catalyst.

It is known that the coal liquefaction process is carried out in a reactor at high pressure and temperature using hydrogen, a solvent and a particulate catalyst, obtaining solid residues, synthetic crude oil and gas fuel. The scarcity of light petroleum fractions in the last decades has made the need of processing the heavy crude oil, as well as the transformation of coal, toward the obtaining of liquid fuels. The aim is to exploit this resource and provide a viable option to obtaining alternative energetic products.

Although many research about coal liquefaction has been made, different authors, (STOHL F., DIEGERT K. V. (1994) *Development of standard direct coal liquefaction activity tests for fine particle size, iron based catalysts. Energy & Fuels* 8, 117-123; PRIYANTO U., SAKANISHI K., OKUMA O., SUMBOGO MURTI S., WATANABLE I., KORAI Y, MOCHIDA I. (2001) *Optimization of two-stage liquefaction of Tanito Harem coal with FeNi catalyst supported on carbon black Energy & Fuels* 15, 856-862; RINCÓN J. M., ANGULO R. (1986) *Petroleum heavy oil mixtures as a source of hydrogen in the liquefaction of Cerrejon coal. Fuel* 65 (7) 899-902) have found that the optimum conditions to achieve high effectiveness, strongly depends on reaction temperature, coal type, solvent and catalyst. Since the catalyst strongly affects the coal liquefaction, it has been a high interest in the development of new catalyst, having high activity and selectivity, low cost and environmental friendly.

Gözmen B. and coworkers (2002. *Direct liquefaction of high-sulfur coals. Energy & Fuels* 16, 1040-1047) have found that the catalyst used in coal liquefaction must be effective in the hydrocracking reactions toward quenching free radicals formed during the thermolysis reactions, removing heteroatoms present in the coal structure, and hydrogenating the appropriate sites in the coal and molecules of the solvent.

It is known that for the coal liquefaction process, a well dispersed catalyst on the support is preferred, because this allows a more intimate contact with the coal. The shape, the conditions and the parameters for catalyst making are important since they determine its properties. By knowing the catalyst properties, the reaction can be controlled, promoting the initial dissolution of coal and reducing unwanted reactions.

It is known that in the coal liquefaction process, a catalyst is used to facilitate the rupture of the coal structure and the hydrogenation of its structural fragments. In the presence of a catalyst, whose active phase can be molybdenum, iron, cobalt, nickel and/or tungsten sulfurs, the reactions of hydrogen transferred are promoted. During the hydrogen transfer, the molecular hydrogen is dissociated into atoms of active hydrogen that stabilize the radicals performing the hydrogenolysis or hydrocracking. This is one of the most critical functions of the catalyst in the initial phase of the liquefaction altogether with the avoiding of retrogressive reactions which lead to the formation of residues of high molecular weight.

It is known that use of bimetallic catalyst in the coal liquefaction process is promising since it has been demonstrated the synergetic effect of the Fe—Mo system. In addition, the state-of-the-art reveals studies where the iron based materials highly dispersed and ultrafine are preferred. The catalyst is made by impregnation in-situ of iron sulfur obtained from mixing a solution of $Na_2S$ with $FeCl_3$ or $Fe_2(SO_4)_3$; a precipitated of iron sulfur on the support is produced. Sometimes, a pretreatment on the surface is carried out with a surfactant in order to enhance the dispersion of the catalyst.

An example was found in the U.S. Pat. No. 5,168,088 where an iron-containing catalyst finely divided or a catalyst precursor is adsorbed on the surface of a particulate coal in the initial steps of direct coal liquefaction or coal hydrogenation. The method consists in precipitate or deposit a catalyst, which is a hydrated iron oxide, directly onto the surface of the coal from a wet paste mixture. Within the precursors of the active form of the catalyst, besides FeOOH, it is mentioned the insoluble iron sulfur such as pyrite. At high temperature, required in the process, the precursor of the catalyst (FeOOH) reacts with $H_2S$ or $CS_2$, turning Fe into an active form of pyrrhotite, $Fe_{1-x}S$ where x is in between 0.1 and 0.2. Although coal contains the necessary sulfur to form $H_2S$ or $CS_2$, additional sulfur may be required to fully activate the iron catalyst.

The U.S. Pat. No. 6,258,259 enclosed a material of iron sulfide of high purity finely divided and process for producing the same. In this invention it has been found that some synthesized compounds, where $FeS_2$ is the main component, show excellent catalytic activity in the hydrogenation processes, specially when they are used as catalyst for coal liquefaction. The material of iron sulfide has the composition of 85% to 100% in weight of $FeS_2$, 0 to 5% in weight of $Fe_{1-x}S$ where x is 0 to 0.2; from 0 to 5% in weight of $Fe_3O_4$ and from 0 to 10% of $FeSO_4$. The process to obtain the material consists in the heating of ferrous sulfate monohydrated and a sulfur compound in an amount not less that the stoichiometric amount in a fluidized bed, being the atmosphere air. The components are burnt and react between 623 and 903K at a pressure of 101,33 kPa.

The U.S. Pat. No. 4,441,983 describes a process for the liquefaction of a solid carbonaceous material at a high pressure and temperature in the presence of a solvent (for the carbonaceous material), hydrogen and a hydrogenation catalyst to produce mainly liquid products, where the improvement comprise the use of an activated zinc sulfide hydrogenation catalyst. Such activation is carried out by exposing the preformed zinc sulfur under hydrogen atmosphere and 755K in a solvent with the absence of the carbonaceous material. The activation is performed in the presence of other sulfurs to avoid the reduction of zinc sulfur during the activation.

Most of the catalysts used in the direct liquefaction contain metallic sulfurs, such as pyrite, which is very active in the hydrogenation process since favor the transference of gaseous hydrogen to the carbonaceous matrix. Additionally, in the DCL, iron-based conventional catalyst are used, which are supported on alumina, zeolites, or activated carbon among others; subsequently, a second metal is incorporated, such as nickel, cobalt, tungsten and molybdenum as catalyst promoters. In spite of all the existent techniques for the production of liquefaction catalysts, there is a great interest in the development of new catalysts highly active and selective, of low cost and environmental friendly.

The catalytic activity has been attributed to the improvement of the dispersion of the catalyst on the coal surface. A highly disperse catalyst provides an effective contact with the solvent and coal at lower concentration of the active phase, reducing the diffusion limitation between particles. Besides, it provides an effective contact with the liquid products coming from the coal liquefaction. The use of hydrogen sulfide increases the yield of liquids in the coal liquefaction process.

It is known that traditionally, the sulfurs of transition metals are obtained when a precursor salt of such metal is reacted with a source of sulfur that can be selected from $CS_2$, $H_2S$, organic compounds that contain sulfurs such as mercaptans or sulfurs obtained under low temperature and pressure conditions. The activation of these catalysts precursors is carried out in the presence of hydrogen at high pressures, from 5 and 10 MPa, and temperatures, from 523 and 753 K.

Because of the severity in the conditions of pressure and temperature to obtain the metal sulfur, this process is expensive and not environmental friendly, since the conditions of handling of the sulfur compounds, and more specifically, the utilization of gases such as $CS_2$, $H_2S$ needs extra-handling care. It is well known that $H_2S$, which is the most used in the process, is a colorless inflammable gas, corrosive and that can be poisonous at high concentrations; hence, it needs a high handling security in the production plant that increase the cost in the obtaining of the catalysts.

It is important to highlight that enormous efforts are being made to provide a process for the catalyst preparation of low cost, to make the catalysts marketable. An option to reduce cost are the use of processes that do not use corrosive substances such as $H_2S$ or the ones that improve the liquid yields, the quality of the distillates, the activity, selectivity and stability of the catalyst, the amount of solvent required and the use of lower severity reaction conditions.

BRIEF DESCRIPTION OF THE DRAWINGS

FIG. 2 is a SEM microphotograph of the coke. FIG. 2a is a microphotograph at 60× magnification, FIG. 2b at 600× magnification and FIG. 3b at 500× magnification.

FIG. 3 are two SEM microphotographs of the catalyst CoS/coke. FIG. 3a is a microphotograph at 60× magnification and FIG. 3b at 800× magnification.

DETAILED DESCRIPTION OF THE INVENTION

Figure 1:
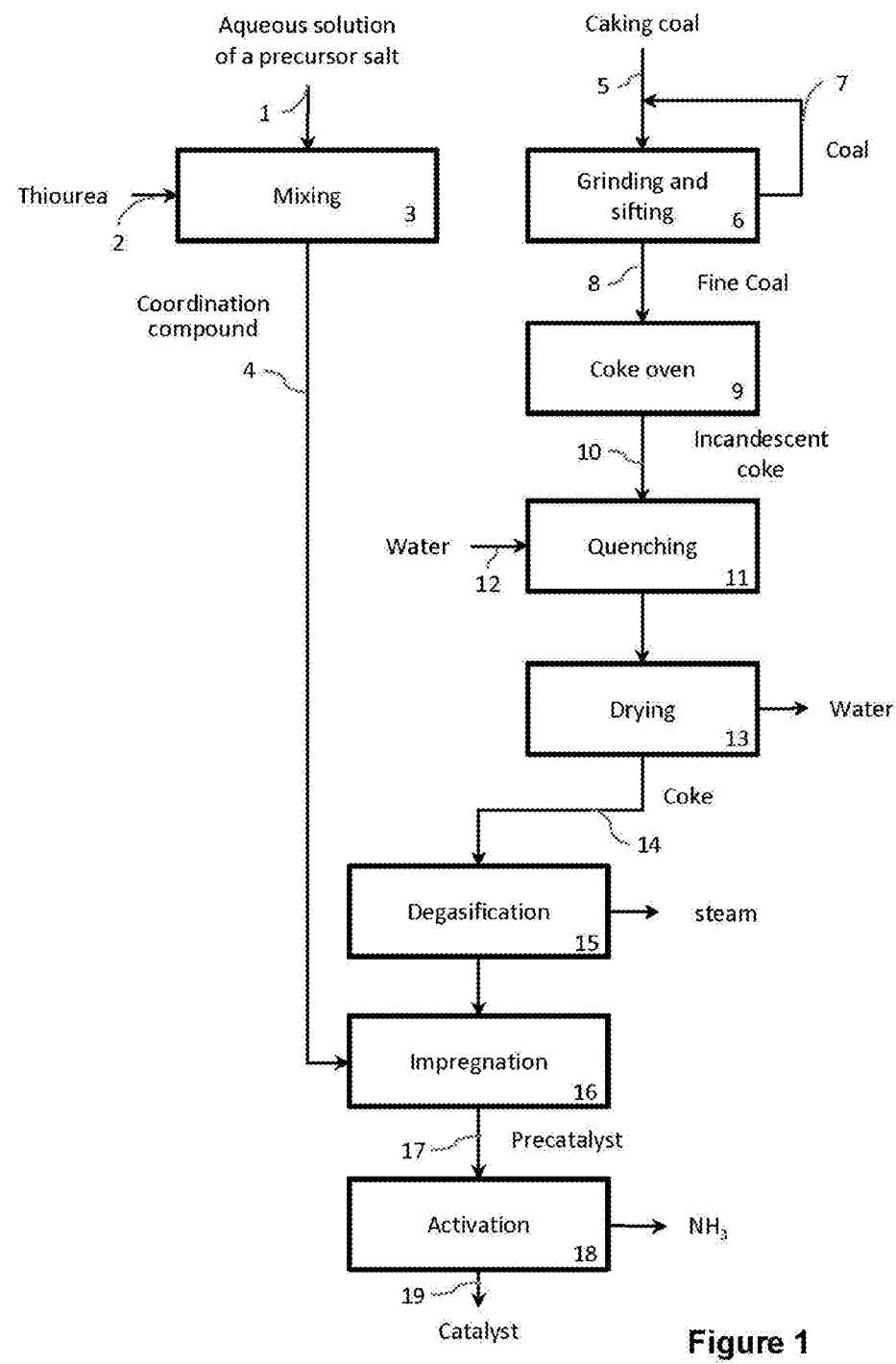
FIG. 1 is a flowchart of the methodology to obtain the metal-thiourea catalyst for the direct coal liquefaction.

The present invention provides an improved process toward the obtaining of a catalyst suitable in the direct coal liquefaction.

The process of the present invention to obtain the catalyst includes steps using less severe reaction conditions. The present invention avoids the sulfide step with $H_2S$, $C_2S$ or $Na_2S$. This improved process via impregnation of a metal-thiourea coordination compound on a carbonaceous material, coke or activated carbon-type, under specific conditions of temperature and pressure, consists in three parts: first, the coordination compound is prepared; second, the impregnation of the coordination compound solution on the support is carried out and third, the obtained material from the impregnation is thermal treated.

In the process of the present invention and according to the diagram shown in FIG. 1, an aqueous solution of a precursor transition metal salt is added (1) to a solution of thiourea (2) in a tank where the solution is mixed (3) to start the reaction and obtain the correspondent coordination compound (4). Such addition is carried out slowly according with a drop by drop procedure with a flow between 0.5 and 1 mL/min; the molar ratio metal:thiourea is 1:2 to 1:5. The temperature of the mixture was selected to be between 290 and 307 K.

In preferred embodiment of the present invention the support catalyst is coke. When the support is a coked carbonaceous material, the selected coal is a coking coal (5) which is milled and sieved (6) until reached a particle size lower than 3 mm being 1 mm preferred. The coal of higher size (7) is recycled (5). The fine coal (8) is coked in an oven (9) heated at a ramp of 20 K/min to reach the selected temperatures between 973 and 1473 K during 2 h. The incandescent coke (10) is quenched (11) with water (12) to avoid the oxidation of the material and is dried (13). The support, carbonaceous material or coke already prepared (14) is degasified (15) at temperatures between 288 and 303 K under vacuum and sonicated during a time interval between 15 and 60 min.

The impregnation of the support (16) is carried out by adding the solution of the metal-thiourea coordination compound (4) to a flow between 0.5 and 2.0 mL/min. This addition is carried out at ambient temperature (between 288 and 303 K), under vacuum conditions and sonicated during 30 min. Such agitation allows a high dispersion of the coordination compound onto the support of the catalyst.

Finally, the catalyst precursor (17) is activated (18) by heating it at the selected temperatures between 420 and 360 K during a period of time between 4 to 8 h at atmospheric pressure; the decomposition of the coordination compound occurs, as a consequence of this thermal treatment, forming the metallic sulfur which is the active phase of the catalyst on the surface of the support.

In other preferred embodiment of the present invention other useful support in the preparation of the catalyst can be selected from a carbonaceous material, activated carbon type, with a surface area between 800 and 1200 $m^2/g$, a volatile matter content between 2.0 and 7.0% in weight, dry base and between 1.0 and 3.0% of ash in weight, dry base; in addition with a carbon content between 90 to 95% in weight, and a sulfur content between 0.6 and 1.0% in weight.

One of the most important advantages of the process of the present invention compared to the state-of-the-art is that the process is comprised by several steps under specific conditions, already described; these factors are determinants to achieve the proposed objectives of cost reduction, and development of processes environmental friendly. Less severe reaction conditions and corrosive substances such as $H_2S$ are not used in the process of the present invention.

In a preferred embodiment of the present invention, the material that is used as catalyst support is made through a previous selection of the coal having coking properties as is described in the procedure. The coke has been selected as support for these catalysts because for its thermal stability, showing important characteristics to be applied in the direct liquefaction of coal, given the drastic conditions of the reaction. The general rule in the design of the catalyst revealed in the state-of-the-art is the use of supports with high surface area; however, it was found that this parameter does not affect greatly the coal liquefaction process neither the selectivity toward the liquid products. According to the studies and as the result of the investigation, it has been conclude that the advantage of the selected support obtained from a carbonaceous material thermal stabilized stems in its affinity with the coal macrostructure to be liquefied, facilitating the diffusion of the macromolecules to the active sites.

Another object of the present invention is to make a catalyst suitable toward the direct coal liquefaction. The catalyst of the present invention has an active phase which is a sulfur of a transition metal, where the transition metal can be molybdenum, iron, nickel, cobalt or a mixture thereof. This active phase is supported on a carbonaceous material that has been subjected to thermal treatment in order to stabilize it, so that it is inert under the process conditions of direct coal liquefaction.

In a preferred embodiment of the present invention, the sulfur of the transition metal is obtained via formation of a metal-thiourea coordination compound. The preferred material used as a support is coke, having a carbon content between 90 to 95% in weight, sulfur content between 0.6 to 1.0% in weight, dry base; volatile matter between 0.5 and 1% in weight, dry base and 7 to 10% in weight of ash, dry base.

The sulfur content deposited as active phase is between 1 and 5% in weight, dry and free-ash base. According to the elemental analysis by scanning electron microscope/energy dispersive X-ray spectrometer (SEM/EDX), the amount of deposited sulfur on the surface of ash is 1 to 5% in weight. This analysis was carried out in an equipment FEI Quanta 2000 with detector SSD (solid state detector) coupled with a microanalyzer to determine the chemical composition of the material.

In other preferred embodiment of the present invention, the support can be selected from an activated carbon that is characterized for having a surface area of 1081 $m^2/g$, a volatile matter content between 2.0 and 7.0% in weight, dry base and between 1.0 and 3.0% of ash in weight, dry base; carbon content between 90 to 95% in weight, sulfur content between 0.6 and 1.0% in weight.

EXAMPLES

Example 1

Preparation of the Cobalt-Thiourea Complex

To the obtaining of the cobalt-thiourea coordination compound, 19.0 mmol of $CoCl_2.6H_2O$ were dissolved in 120 mL of hot butanol. Then, 50.0 mmol of thiourea were added slowly with constant agitation. The mixture was quenched and benzene was added until turbidity is observed. The obtained blue solid was filtered and dried at room temperature.

Example 2

Preparation of the Catalyst

With the coordination compound obtained in the example 1, the impregnation on the coke was carried out by adding the solution of the cobalt-thiourea coordination compound at a flow of 1.0 mL/min. This addition was carried out at room temperature and under vacuum conditions and sonicated during 30 min. The precursor catalyst was heated to a temperature of 443 K during a period of 6 h. The obtained catalyst shows a high dispersion with a surface composition of 2.2% in weight of cobalt and 1.6% of deposited sulfur.

FIG. 2a shows a SEM microphotograph of the support at 60× where the amorphous matrix of the coke is evident. Some grains of white color are observed (FIG. 2b) as well as silver particles (FIG. 2c). The analyses by SEM reveal that the firsts are constituted mainly by Si and Al, while the seconds correspond to materials rich in Fe and S. Table 1 shows the analysis of the elemental composition EDX in three places selected in the coke microphotograph; the point 1 of analysis corresponds to an area where the coke is situated; the other two points correspond to the places where a white grain and silver particle are located, respectively. It is important to highlight that the data in Table 1 shows the presence of Fe and S, and the absence of Co and Ni in the coke.

TABLE 1

Analyses SEM/EDX showing the Chemicals composition of the sites located in the coke microphotographs

| Site | % C | % O | % Al | % Si | % S | % Fe | % Ni | % Co | % Others |
|------|------|-----|------|------|-----|------|------|------|----------|
| 1 | 96.4 | 1.6 | 0.5 | 0.6 | 0.9 | 0 | 0 | 0 | 0 |
| 2 | 75.7 | 7.6 | 5.0 | 9.6 | 0.3 | 0.7 | 0 | 0 | 1.1 |
| 3 | 45.2 | 7.1 | 0.9 | 1.1 | 9.9 | 35.7 | 0 | 0 | 0 |

FIG. 3a shows the microphotograph of the catalyst CoS/coke. The analysis of the scanning electron microscope (SEM) energy dispersive X-ray (EDX) gives the elemental composition shown in Table 2 and allows to locate the sites (FIG. 3b) where the active phase is found (white conglomerates with a cobalt percent of 2.5 and total sulfur 2.5%, where 1.6% corresponds to the deposited sulfur, which suggests the formation of CoS. These results show that the proposed method to prepare the catalyst for the direct liquefaction of coal via impregnation with metal-thiourea complex is a simple alternative, being environmental friendly.

TABLE 2

Analyses SEM/EDX of the Chemicals composition of the sites located in the microphotograph of the catalyst Co/coke

| Site | % C | % O | % Al | % Si | % S | % Fe | % Ni | % Co | % Otros |
|------|------|-----|------|------|-----|------|------|------|---------|
| 1 | 85.3 | 8.5 | 0.5 | 0.8 | 2.5 | 0.2 | 0.0 | 2.2 | 0.0 |

Example 3

Liquefaction of a Bituminous Coal from Cundinamarca State, Colombia (Yerbabuena No. 1)

The coal Yerbabuena No. 1 was milled until obtain an average particle size of 100 mm and dried at 393 K for 2 h. The dried coal, together with tetraline as a solvent and the catalyst obtained during the procedure described in the example 2, were loaded into the reactor, which was sealed and purged several times with nitrogen before pressurization with hydrogen at 8.0 MPa. Then, the reactor was heated at a ramp of 9 K/min until reach 723 K with agitation of 120 rpm. The mixture was reacted during 1 h and the liquid, solid and gaseous products were recovered. The liquid fraction was separated by filtration and the remaining solid was THF-Soxhlet extracted for 24 h. The THF insolubles were dried at 493 K for 8 h; this material is the so-called residue. The products of the liquefaction solubles in THF endure a sequence of extractions with n-hexane and acetone. The soluble fraction in n-hexane is defined as oils (O), the fraction insoluble in hexane but soluble in acetone as asphaltenes (A) and the insoluble in n-hexane and acetone but solubles in THF as preasphaltenes (PA).

The results of the total conversion of coal (expressed as soluble in THF after reaction) and the oil yields, asphalthenes and preasphaltenes for the coal Yerbabuena No. 1 with or without catalyst are shown in Table 3. The results show the high benefit in the conversion of coal and oil yields using the catalyst, through the decreasing the yields of the heavier fractions, asphaltenes and preasphaltenes.

TABLE 3

Total conversion and fraction yields derived from the catalytic liquefaction of coal Yerbabuena No. 1

| Catalyst | Total conversion (%) | Fraction yields$^{dbaf}$ (%) | | |
|---|---|---|---|---|
| | | O | A | PA |
| Without catalyst | 45.8 | 15.2 | 18.8 | 11.9 |
| CoS/coke | 67.1 | 33.7 | 18.3 | 15.1 |
| FeS$_2$/coke | 58.3 | 31.3 | 13.4 | 13.6 |
| NiS/coke | 66.2 | 32.2 | 16.6 | 17.4 |

$^{dbaf}$dry base ash free.
O is oils;
A corresponds to Asphaltenes and
PA to preasphaltenes Example 4

Comparative Essay

The catalysts of iron/g-alumina and nickel/g-alumina were made following the procedure shown in the examples 1 and 2. Table 4 shows the content of sulfur deposited on the catalyst as a consequence of the impregnation of the support. The content of sulfur in the catalysts was analyzed in LECO® SC-32.

TABLE 4

Prepared catalysts and deposited sulfur content

| Supports | Catalysts | % S (w/w) |
|---|---|---|
| γ-alumina | FeS$_2$/γ-alumina | 2.6 |
| | NiS/γ-alumina | 1.0 |
| Coke | FeS$_2$/Coke | 2.1 |
| | NiS/Coke | 1.7 |

The catalysts FeS$_2$/γ-alumina, FeS$_2$/Coke, FeS$_2$/activated carbon, NiS/γ-alumina, NiS/Coke, and NiS/activated carbon were tested using the same conditions described in the example 3. The results of total conversion of coal (expressed as soluble product in THF after reaction) and oil, asphaltenes and preasphaltenes yield for the coal Yerbabuena No. 1 are reported in Table 5.

TABLE 5

Total conversion and fraction yield of the products derived from the catalytic liquefaction of coal Yerbabuena No. 1

| Catalyst | Total conversion (%) | Fraction yield$^{dbaf}$ (%) | | |
|---|---|---|---|---|
| | | O | A | PA |
| Without catalyst | 45.8 | 15.2 | 18.8 | 11.9 |
| FeS$_2$/γ-Al$_2$O$_3$ | 47.8 | 24.6 | 13.3 | 9.8 |
| FeS$_2$/coke | 58.3 | 31.3 | 13.4 | 13.6 |
| FeS$_2$/CA | 56.0 | 32.0 | 13.4 | 10.6 |
| NiS/γ-Al$_2$O$_3$ | 48.9 | 22.5 | 14.8 | 11.7 |
| NiS/coke | 66.2 | 66.2 | 16.6 | 17.4 |
| NiS/CA | 65.8 | 30.9 | 16.2 | 18.7 |

$^{dbaf}$dry base ash free.
O is oils;
A corresponds to asphaltenes and
PA to preasphaltenes For the catalyst supported on g-alumina, the total conversion, as well as the oil yield is lower when compared to its counterpart catalyst supported on coke. The catalyst supported on the carbonaceous material shows an increase of 25% in conversion and double the oil yield; in addition, higher yields of asphaltenes and preasphaltenes are obtained. These results show the advantage of using the carbonaceous support, which shows affinity with the macrostructure of the coal, when compared with an inorganic matrix such as g-alumina. The big porosity of the coke facilitates the diffusion through the catalyst of the macromolecules derived from the coal pyrolysis; this factor favors the interaction of the active phase of the catalyst with the formed radicals, hindering their recombination, hence, the oil yield is increased.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process to obtaining a catalyst suitable for direct coal liquefaction characterized in that the following steps are carried out:
   a) Preparation of the metal-thiourea coordination compounds by adding an aqueous solution of a precursor salt of one or more transition metals selected from molybdenum, iron, nickel, or cobalt to a thiourea solution, at room temperature that can be selected from the interval between 290 and 307 K, and where the addition of the precursor salt to the thiourea is carried out at a flow of 0.5 to 1 mL/min;
   b) Impregnation of a carbonaceous material, thermally stabilized at temperatures between 973 and 1473 K, used as support of the catalyst under vacuum and sonicated; and
   c) Catalyst activation by thermal treatment at selected temperatures between 420 and 460 K and atmospheric pressure.

2. The process according to claim 1 characterized in that the step a) preparation of the metal-thiourea coordination compounds, the molar ratio metal:thiourea is between 1:2 to 1:5.

3. The process according to claim 1 characterized in that the step a) preparation of the metal-thiourea coordination compounds, the addition of the compounds to the thiourea solution is carried out according to a drop by drop procedure.

4. The process according to claim 1 characterized in that the step b) the impregnation is carried out by adding the solution of metal-thiourea coordination compound at a flow between 0.5 and 1.0 mL/min.

5. The process according to claim 1 characterized in that the vacuum and sonication in step b) is carried out at a temperature between 288 and 303 K.

6. The process according to claim 1 characterized in that the step b) is carried out under vacuum conditions and sonicated during 30 min.

7. The process according to claim 1 characterized in that the step b) a catalyst precursor is obtained with high dispersion of the coordination compound onto the catalyst support.

8. The process according to claim 1 characterized in that the step b) the carbonaceous material is pretreated at temperatures between 900 and 1473 K in absence of air, degasified at temperature between 288 and 303 K under vacuum and sonicated between 15 and 60 min.

9. The process according to claim 1 characterized in that the step c) the precursor catalyst is subjected to thermal treatment at selected temperatures between 420 and 460 K for a period of time between 4 and 8 h.

10. A coal liquefaction catalyst, comprising:
  a) an active phase which is a sulfur-containing transition metal selected from molybdenum, iron, nickel, cobalt or mixtures thereof, obtained with the addition of an aqueous solution of a precursor salt to the thiourea solution at a flow rate of 0.5 to 1 mL/min and at temperatures between 290 to 307 K, and subsequent activation by thermal treatment at selected temperatures between 420 and 460 K and atmospheric pressure; and
  b) a coke or coked carbonaceous material from coking coal which has been subjected to thermal stabilization at temperatures between 973 and 1473 K to be inert in the conditions of direct coal liquefaction.

11. The catalyst according to claim 10 wherein: the active phase is dispersed on the carbonaceous material.

12. The catalyst according to claim 10 wherein: the deposited sulfur content as active phase is 1 to 5% by weight, dry and ash-free.

13. The catalyst according to claim 10 wherein the metal content deposited on a surface of the catalyst is 1 to 5% by weight and the sulfur content deposited on the surface of the catalyst is 1 to 5% by weight.

14. The catalyst according to claim 10 wherein the coke has a carbon content between 90 and 95% by weight, sulfur content between 0.6 and 1.0% by weight, dry base; a volatile matter between 0.5 to 1.0% in weight, dry base and 7 to 10% in weight of ash, dry base.

* * * * *